June 11, 1968   H. S. HARRISON   3,387,697
DRIVE FOR CONVEYOR CHAIN
Filed April 26, 1966   5 Sheets-Sheet 1
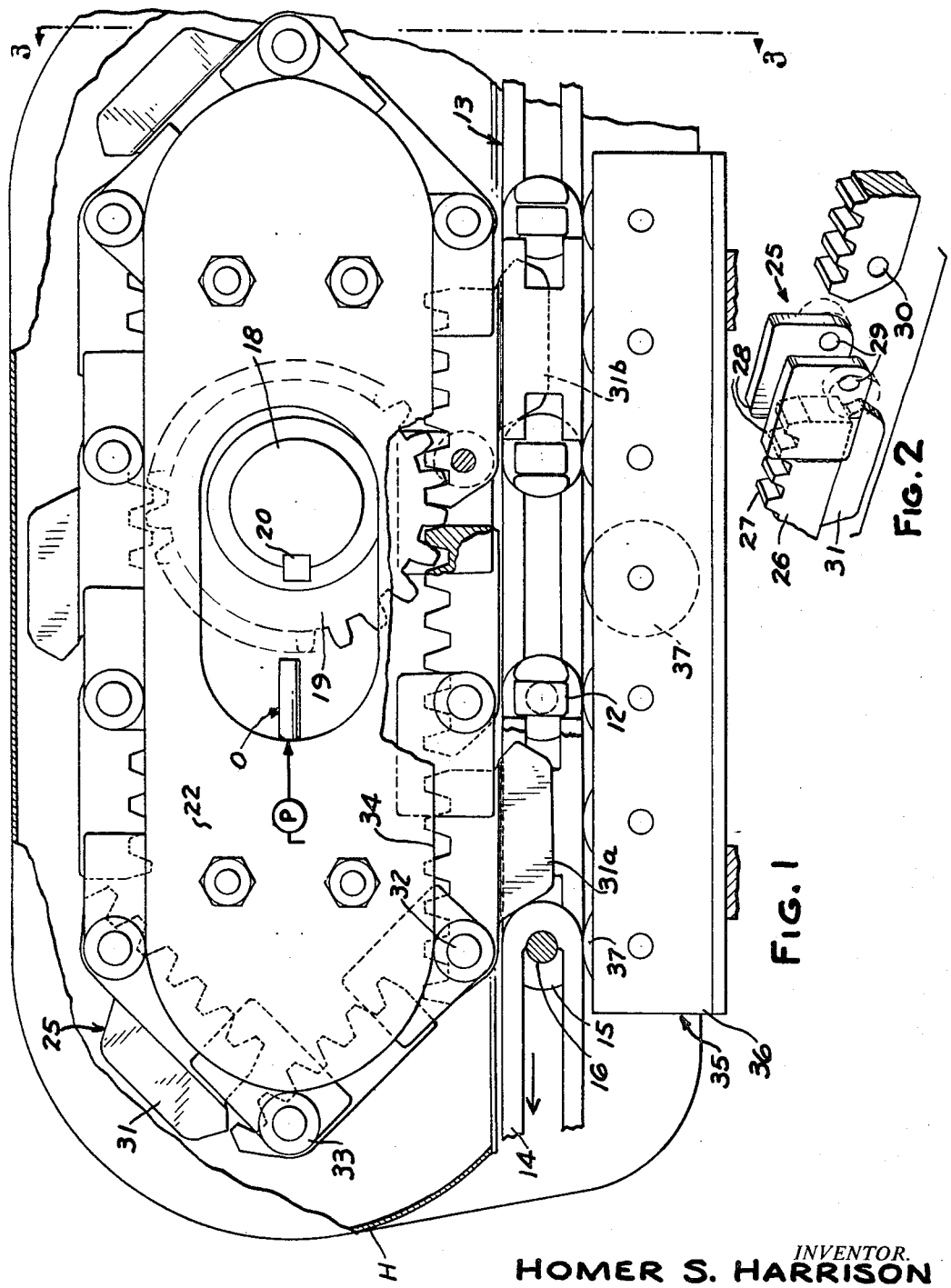
INVENTOR.
HOMER S. HARRISON
BY
ATTORNEYS June 11, 1968  H. S. HARRISON  3,387,697
DRIVE FOR CONVEYOR CHAIN
Filed April 26, 1966  5 Sheets-Sheet 2

INVENTOR.
HOMER S. HARRISON
BY
Barnes, Kisselle, Raisch & Choate
ATTORNEYS

June 11, 1968  H. S. HARRISON  3,387,697
DRIVE FOR CONVEYOR CHAIN
Filed April 26, 1966  5 Sheets-Sheet 3

INVENTOR.
HOMER S. HARRISON
BY
Barnes, Kisselle, Raisch & Choate
ATTORNEYS

INVENTOR.
HOMER S. HARRISON

ATTORNEYS

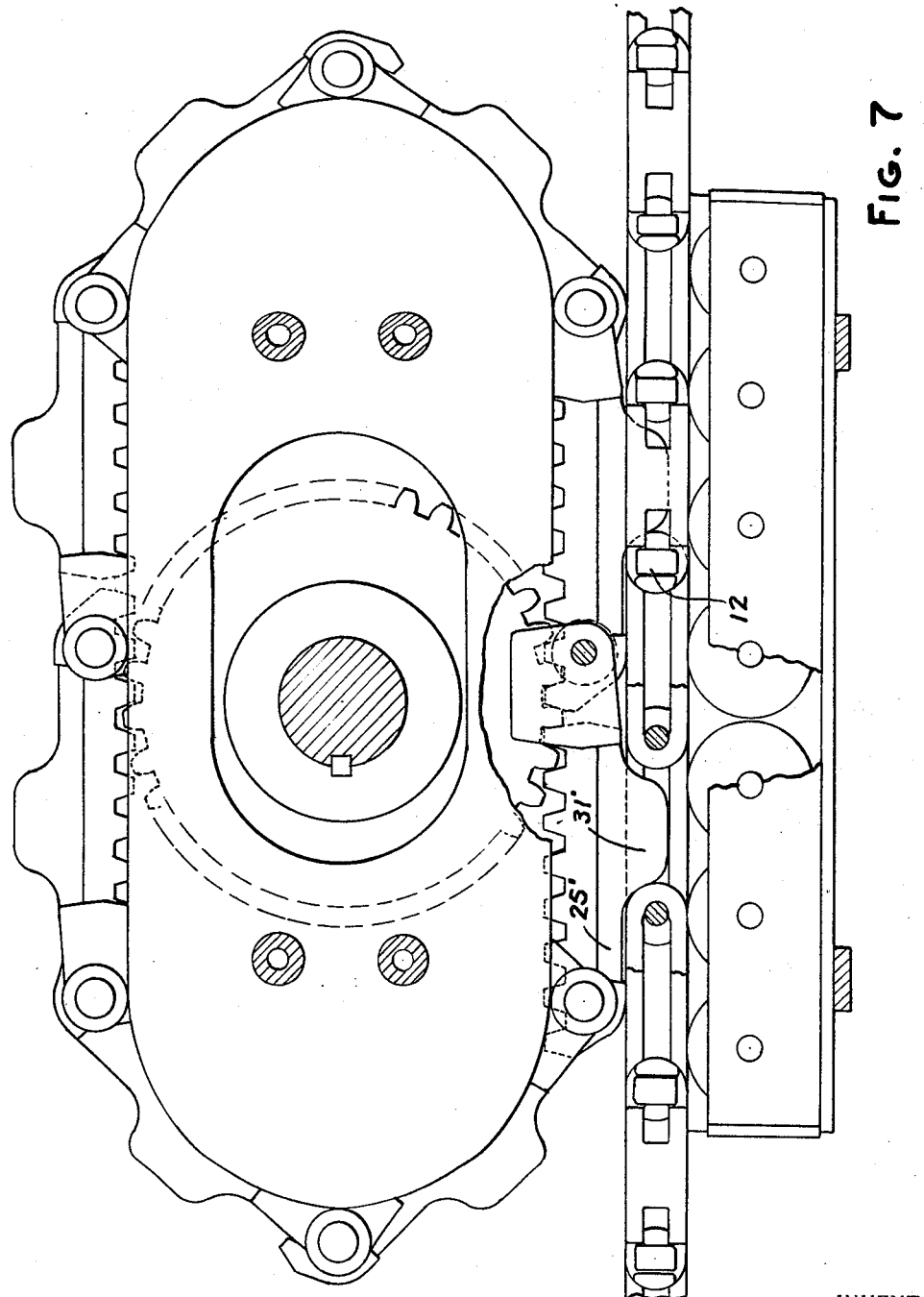

United States Patent Office 3,387,697
Patented June 11, 1968

3,387,697
DRIVE FOR CONVEYOR CHAIN
Homer S. Harrison, Detroit, Mich., assignor to Mechanical Handling Systems, Inc., Warren, Mich., a corporation of Michigan
Filed Apr. 26, 1966, Ser. No. 545,457
22 Claims. (Cl. 198—203)

ABSTRACT OF THE DISCLOSURE

The drive for conveyor chain disclosed herein comprises an endless drive member which is made up of a plurality of pivotally interconnected segments, each of which has a plurality of longitudinally spaced teeth thereon engaging a gear. At least some of the segments have interengaging means thereon for engaging a chain. A guide forms an endless track which is engaged by contact means on segments. At least a portion of the guide extends parallel to the chain and backup means extend along said parallel portion for holding the chain in engagement with the segments.

---

This invention relates to conveyor systems and particularly to a drive for conveyor chains.

In power and free conveyor systems of the overhead or subfloor type, it is conventional to drive the conveyor chains continuously through what is known as a caterpillar drive such as shown in the patent to Bishop et al. 2,868,138. Although such drives are quite efficient, they have two major disadvantages, namely, they are large in size requiring substantial space and are relatively expensive.

It is therefore an object of this invention to provide a drive for conveyor chains which is compact and low in cost; which is efficient and which requires a minimum of maintenance.

In the drawings:

FIG. 1 is a fragmentary part sectional plan view of a drive for conveyor chains embodying the invention.

FIG. 2 is a fragmentary exploded view of a portion of the drive shown in FIG. 1.

FIG. 7 is a fragmentary plan view of a further modified form of drive for conveyor chains.

Figure 3:
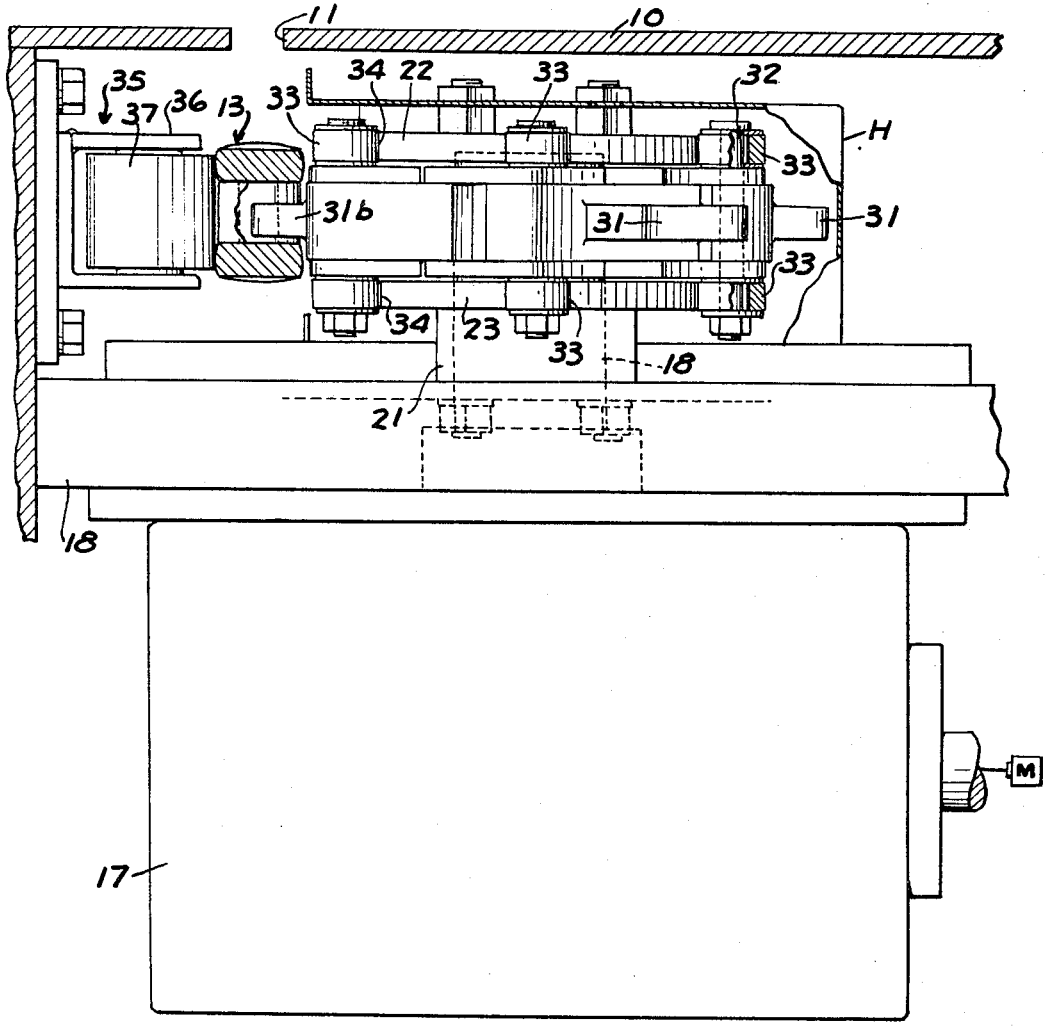
FIG. 3 is a part sectional view taken along the line 3—3 in FIG. 1.

Referring to FIGS. 1-3, the invention is shown as applied to a conveyor chain which is positioned beneath the floor and used in connection with a tow truck conveyor system such as shown in the patent to Klamp et al. 2,965,043. Referring to FIG. 3, the drive is positioned beneath a floor 10 which has a slot 11 therein through which the tow pin of a tow truck (not shown) extends and is adapted to be engaged by one of the lugs 12 of a conveyor chain 13. The chain 13 may be of any general type and herein shown as comprising loops or links 14 which are interconnected by spaced plates 15 and pins 16 extending between the plates and through the links 14. A speed reduction gearbox 17 is mounted on a cross beam 18 beneath the floor 10 and receives a drive from a motor M which is shown schematically. The output of the gearbox 17 comprises a shaft 18 which extends vertically upwardly. A gear 19 is fixed to the shaft 18 by a key 20 so that the gear 19 is continuously rotated when the motor M is driving the gears of the gearbox 17. Shaft 18 extends upwardly through a sleeve 21. A pair of spaced plates 22, 23 are fixed on the sleeve 21 and the outer periphery of the plates forms a guide as presently described.

A plurality of segments 25 are pivotally interconnected to form an endless drive member that forms the driving connection between the gear 19 and the chain 13. As shown in FIG. 2, each segment 25 comprises a body 26 having a plurality of longitudinally spaced teeth 27 forming a gear segment, a pair of plates 28 fixed on one end of the body 26 and having aligned openings 29 therein, an opening 30 formed on the other end of the body and a projection or lug 31 welded to the body 26 and extending in a direction oppositely from the teeth 27. A pin 32 extends through the openings 29 of one segment and the opening 30 of an adjacent segment to pivotally interconnect the adjacent segments. Rollers 33 are mounted on the ends of the pins 32 by roller bearings and are adapted to engage the outer peripheries of the plates 22, 23 to guide the endless member along the outer peripheries of the plates 22, 23.

As shown in FIG. 1, the endless member is positioned on the plate with the teeth 27 of the segment 25 extending inwardly and the projections 31 outwardly. As shown in FIG. 1, the plates 22, 23 include a portion 34 that extends in parallel relationship to the path of the chain 13. In this portion, the gear 19 engages the teeth 27 of each segment to successively drive the segment and move the guide member in an endless path.

A backup mechanism 35 comprising a bracket 36 and a plurality of rollers 37 forces and holds the chain 13 against movement outwardly away from the segments in the parallel reach or portion 34. The arrangement is such that a projection or lug 31 is always in engagement with the chain 13. Thus, as shown in FIG. 1, with the chain being driven to the left, the lug 31a is driving the chain while the lug 31b is moving into position for driving the chain. Before the lug 31a moves out of engagement with the chain, lug 31b will have moved into position for continuing the drive of the chain.

It can be seen that the arrangement is such that the drive occupies a minimum of space transversely of the chain.

Figure 4:
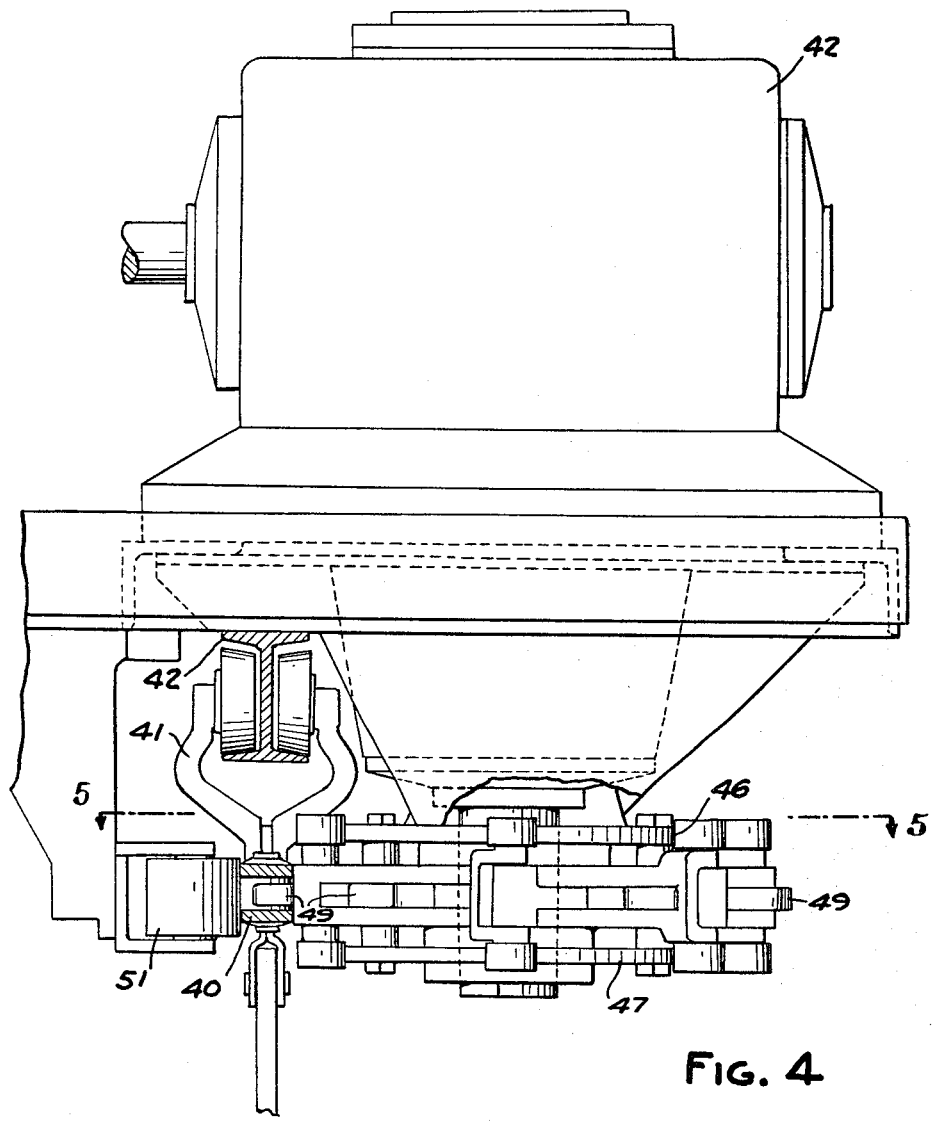
FIG. 4 is a fragmentary elevational view of a modified form of the drive for conveyor chains.
Figure 5:
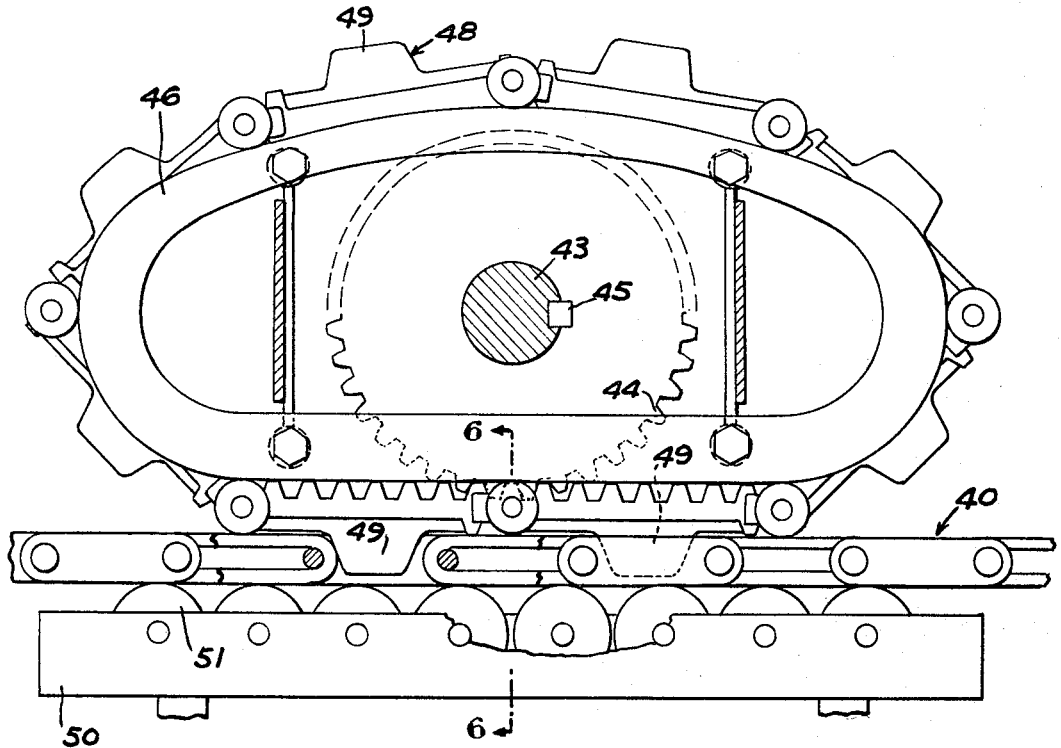
FIG. 5 is a fragmentary sectional view taken along the line 5—5 in FIG. 4.
Figure 6:
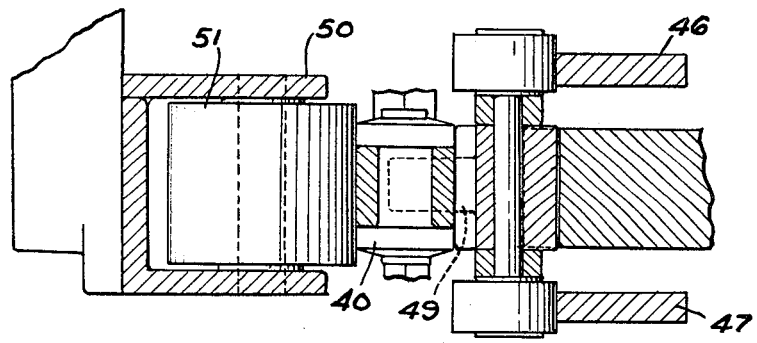
FIG. 6 is a fragmentary sectional view on an enlarged scale taken along the line 6—6 in FIG. 5.

In the form of the invention shown in FIGS. 4-6, the drive is shown as applied to an overhead chain for driving trolleys along a track. As shown, the chain 40 is suspended by trolleys 41 from an I-beam 42 in a manner shown more completely in the patent to Bishop et al. 2,868,138. Drive is supplied through a reduction gearbox 42 from a motor to drive a vertical output shaft 43 on which a gear 44 is keyed by a key 45. Spaced angular plates 46. 47 are supported to provide guides along the periphery in the manner of the previously described form of the invention. In the form shown in FIGS. 4-6, the segments 48 each have outwardly extending projections 49 so that in effect the segments are of greater length than those shown in the form shown in FIGS. 1-3, namely, a length substantially equal to the pitch of the chain. Accordingly, with the segments being longer, it is necessary that the plates 46, 47 have an overall greater transverse width to permit the segments to move in an endless path. The form of the invention shown in FIGS. 4-6 thus occupies a greater transverse width than that shown in FIGS. 1-3. As in the previous form of the invention, a backup assembly 50 is provided with a plurality of rollers 51 that prevent movement of the chain 40 away from the reach of the endless member that is providing the driving connection.

In the form of the invention shown in FIG. 7, each of the segments 25' is formed with a projection 31' that is adapted to engage alternate lengths of chain. Such an arrangement is similar to that shown in FIG. 1 except that a greater lateral dimension is needed to accommodate the greater length of the segments 25' since each segment must be equal to one pitch link of the chain. In the form of the invention shown in FIG. 1, each segment is equal to one-half of the pitch length link of the chain since alternate lengths have projections 31 thereon.

In each of the forms of the invention, lubrication may be provided as shown in FIGS. 1 and 2. This includes a housing H surrounding the conveyor drive and an oil pipe O to which oil under pressure from a pump P is supplied. The outlet of pipe O is directed against the gear 19 Similar arrangements are provided in the other forms of the invention but they have been omitted for purposes of clarity.

I claim:

1. In a drive for conveyor chains, the combination comprising
    a gear,
    a plurality of segments pivotally interconnected to one another to form an endless drive member,
    each said segment having a plurality of longitudinally spaced teeth engaging successively the teeth of said gear,
    a chain,
    at least some of said segments having interengaging means for engaging said chain,
    a guide forming an outwardly facing continuous endless track,
    and contact means on said segments engaging said guide and guiding the endless drive member in an endless path,
    said guide having at least one portion thereof extending parallel to said chain whereby the interengaging means between the chain and said segments are in engagement at said portion.

2. The combination set forth in claim 1 wherein said contact means are provided at the pivotal connection of said segments to one another.

3. The combination set forth in claim 2 wherein said contact means comprises rollers.

4. The combination set forth in claim 1 wherein said interengaging means comprises outwardly extending projections adapted to engage corresponding spaces in said chain.

5. The combination set forth in claim 1 wherein each said segment comprises a body having said teeth thereon,
    a pair of plates welded to one end of said body and having aligned openings therein,
    said body having an opening in the other end thereof whereby said other end is adapted to extend between the plates of an adjacent segment,
    and a pin extending through the openings in said plates and said opening in said body to pivotally interconnect adjacent segments.

6. The combination set forth in claim 5 wherein said interengaging means includes a projection welded to said body and extending generally radially outwardly from the endless drive member.

7. The combination set forth in claim 1 wherein said guide means comprises spaced plates,
    said contact means comprising spaced rollers engaging said plates.

8. In a drive for conveyor chains, the combination comprising
    a gear,
    a plurality of segments pivotally interconnected to one another to form an endless drive member,
    each said segment having a plurality of longitudinally spaced teeth engaging successively the teeth of said gear,
    at least some of said segments having interengaging means for engaging a chain,
    a guide forming an outwardly facing continuous endless track,
    and contact means on said segments engaging said guide and guiding the endless drive member in its path,
    said guide having at least one portion thereof adapted to extend parallel to a chain whereby the interengaging means on said segments may engage said chain at said portion.

9. The combination set forth in claim 8 wherein said contact means are provided at the pivotal connection of said segments to one another.

10. The combination set forth in claim 9 wherein said contact means comprises rollers.

11. The combination set forth in claim 8 wherein said interengaging means comprises outwardly extending projections adapted to engage corresponding spaces in a chain.

12. The combination set forth in claim 8 wherein each said segment comprises a body having said teeth thereon,
    a pair of plates welded to one end of said body and having aligned openings therein,
    said body having an opening in the other end thereof whereby said other end is adapted to extend between the plates of an adjacent segment,
    and a pin extending through the openings in said plates and said opening in said body to pivotally interconnect adjacent segments.

13. The combination set forth in claim 12 wherein said interengaging means includes a projection welded to said body and extending generally radially outwardly from the endless drive member.

14. The combination set forth in claim 8 wherein said guide means comprises spaced plates,
    said contact means comprises spaced rollers engaging said plate.

15. In a drive for conveyor chains, the combination comprising
    a plurality of segments pivotally interconnected to one another to form an endless drive member,
    each said segment having a plurality of longitudinally spaced teeth adapted to successively engage the teeth of a gear,
    at least some of said segments having outwardly extending projections for engaging a chain,
    and contact means on said segments adapted to engage the periphery of a guide having an outwardly facing continuous endless track for guiding the endless drive member in its path.

16. The combination set forth in claim 15 wherein said contact means are provided at the pivotal connection of said segments to one another.

17. The combination set forth in claim 16 wherein said contact means comprises rollers.

18. The combination set forth in claim 17 wherein each said segment comprises a body having said teeth thereon,
    a pair of plates welded to one end of said body and having aligned openings therein,
    said body having an opening in the other end thereof whereby said other end is adapted to extend between the plates of an adjacent segment,
    and a pin extending through the openings in said plates and said opening in said body to pivotally interconnect adjacent segments.

19. In a drive for conveyor chains, the combination comprising
    a gear,
    a plurality of segments pivotally interconnected to one another to form an endless drive member,
    each said segment having a plurality of longitudinally spaced teeth engaging successively the teeth of said gear,
    a chain,
    at least some of said segments having interengaging means for engaging said chain,
    a guide forming an endless track,
    and contact means on said segments engaging said guide and guiding the endless drive member in an endless path,
    said guide having at least one portion thereof extending parallel to said chain whereby the interengaging means between the chain and said segments are in engagement at said portion, backup means extending along said parallel portion of said guide along the other side of said chain.

20. The combination set forth in claim 19 wherein said backup means comprises a plurality of longitudinally spaced rollers.

21. In a drive for conveyor chains, the combination comprising a gear, a plurality of segments pivotally interconnected to one another to form an endless drive member, each said segment having a plurality of longitudinally spaced teeth engaging successively the teeth of said gear, at least some of said segments having interengaging means for engaging a chain or the like, a guide forming an endless track, and contact means on said segments engaging said guide and guiding the endless drive member in its path, said guide having at least one portion thereof adapted to extend parallel to a chain whereby the interengaging means on said segments may engage said chain at said portion, backup means extending along said parallel portion of said guide and adapted to contact the other side of said chain.

22. The combination set forth in claim 21 wherein said backup means comprises a plurality of longitudinally spaced rollers.

References Cited

UNITED STATES PATENTS

| | | | |
|---|---|---|---|
| 164,473 | 6/1875 | Olds | 74—250 |
| 867,208 | 9/1907 | McIntyre | 74—250 |
| 1,236,840 | 8/1917 | Hescock | 74—219 |
| 1,300,401 | 4/1919 | John | 74—245 XR |
| 1,430,906 | 10/1922 | John. | |
| 1,930,466 | 10/1933 | Bowman. | |
| 2,609,086 | 9/1952 | McBride et al. | 198—203 |
| 2,798,592 | 7/1957 | Uhrich et al. | 198—203 |

FRED C. MATTERN, JR., *Primary Examiner.*

J. A. WONG, *Assistant Examiner.*